United States Patent [19]

Grimminger et al.

[11] 4,255,161

[45] Mar. 10, 1981

[54] APPARATUS FOR INTRODUCING SOLID FUELS INTO A PRESSURE GASIFICATION REACTOR

[75] Inventors: Albert Grimminger, Leonberg; Jürgen Strecker; Werner Wiedmann, both of Stuttgart; Peter Wenning, Gelsenkirchen-Buer, all of Fed. Rep. of Germany

[73] Assignees: Werner & Pfleiderer, Stuttgart; Veba Oel AG, Gelsenkirchen-Buer, both of Fed. Rep. of Germany

[21] Appl. No.: 92,737

[22] Filed: Nov. 9, 1979

[30] Foreign Application Priority Data

Nov. 18, 1978 [DE] Fed. Rep. of Germany ....... 2850121

[51] Int. Cl.³ .............................................. C10J 3/50
[52] U.S. Cl. ...................................... 48/86 R; 44/13; 264/101; 366/196; 414/218; 425/203; 425/208; 425/296
[58] Field of Search ............... 48/86 R; 414/217, 218, 414/292; 425/203, 208, 812, 296, 182 R; 264/101, 102, 141; 44/13; 202/262; 366/186, 194, 195, 196

[56] References Cited

U.S. PATENT DOCUMENTS

| 1,941,572 | 1/1934 | Morrow | 406/60 |
| 2,078,565 | 4/1937 | Dürst et al. | 264/102 |
| 2,321,015 | 6/1943 | Davis | 414/218 |
| 2,355,774 | 8/1944 | Baker | 406/60 |
| 2,428,995 | 10/1947 | Rogers | 414/218 |
| 3,104,020 | 9/1963 | Klapp | 414/218 |
| 3,341,280 | 9/1967 | Eolkin | 414/218 |
| 3,756,434 | 9/1973 | Teske | 414/218 |
| 3,976,548 | 8/1976 | Kevorkian et al. | 48/86 R |
| 4,209,304 | 6/1980 | Kessler et al. | 48/86 R |

FOREIGN PATENT DOCUMENTS

| 675772 | 5/1939 | Fed. Rep. of Germany . | |
| 878253 | 7/1953 | Fed. Rep. of Germany . | |
| 906602 | 3/1954 | Fed. Rep. of Germany . | |
| 972895 | 10/1959 | Fed. Rep. of Germany . | |
| 1937862 | 2/1971 | Fed. Rep. of Germany | 264/141 |
| 978138 | 11/1950 | France . | |
| 1212522 | 10/1959 | France . | |
| 1412635 | 4/1965 | France . | |

Primary Examiner—S. Leon Bashore
Assistant Examiner—Michael Goldman
Attorney, Agent, or Firm—Hane, Roberts, Spiecens & Cohen

[57] ABSTRACT

Apparatus for introducing solid fuels into a pressure gasification reactor comprising at least one conveyor worm turnable in a housing for conveying finely divided fuel, optionally mixed with a binder, and compacting the fuel into a gas-tight plug which is discharged through a discharge opening leading to the pressure gasification reactor. The discharge opening is provided with a closure member and the housing has an outlet opening also provided with a closure member near the discharge opening. The outlet opening is open to the ambient atmosphere. The closure members of the discharge opening and the outlet opening are alternatively actuatable such that when one is open the other is closed.

11 Claims, 3 Drawing Figures

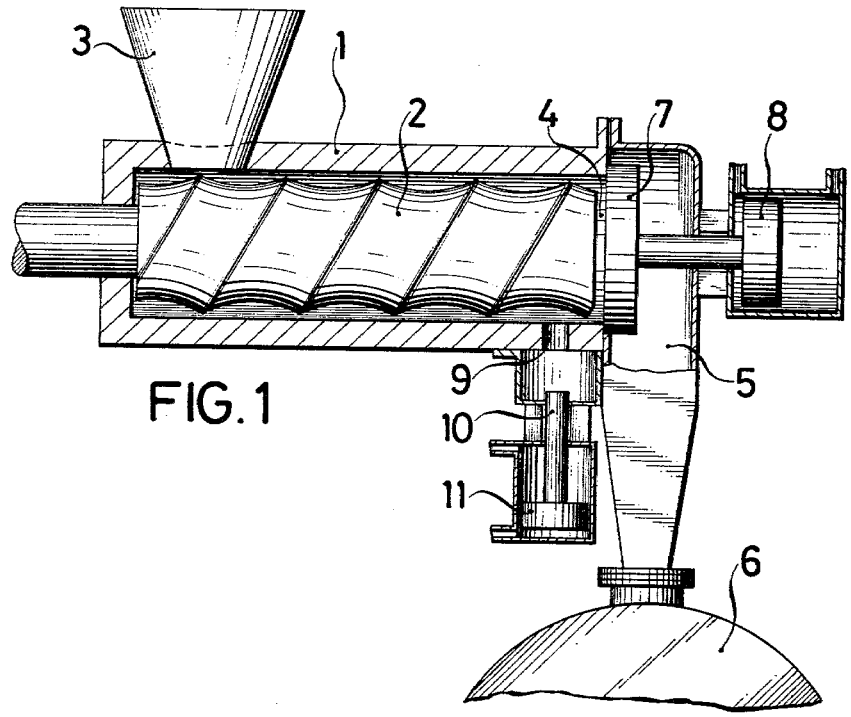
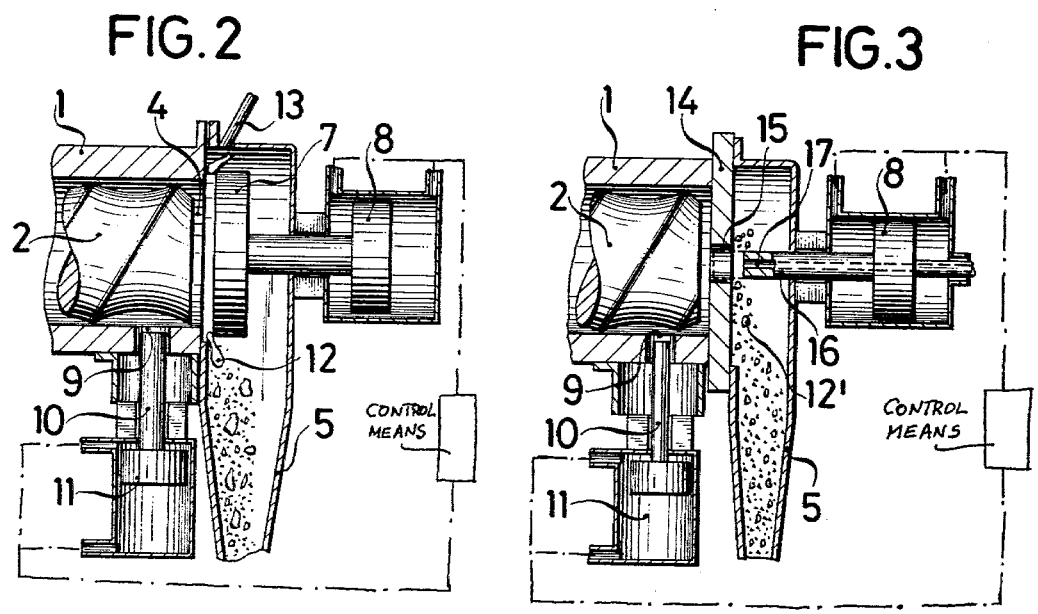

APPARATUS FOR INTRODUCING SOLID FUELS INTO A PRESSURE GASIFICATION REACTOR

FIELD OF THE INVENTION

The present invention relates to an apparatus for introducing solid fuels into a pressure gasification reactor. The apparatus comprises at least one conveyor worm which is rotatable in tightly fitted manner in a housing, by which conveyor worm the finely divided fuel, optionally mixed with a binder, is compacted into a gas-tight plug and is ejected through a discharge opening in the housing which is in communication with the pressure gasification reactor.

PRIOR ART

The use of single-shaft or multi-shaft screw extruders for the charging of coal gasification reactors is known, for instance, from West German Provisional Patent 26 29 182. In the process described therein, a pasty mass of coal produced by a mixture of finely divided coal with a special binder is pressed by a shaping plate into the reactor. Consequently, cylindrically shaped bodies are produced which are suitable for gasification in a solid-bed reactor.

A screw extruder suitable for the same purpose and having a compression nozzle which is of variable length and cross section is known from West German Unexamined Application 25 51 369. In this case briquette-shaped compacts are produced upon shaping of the mass of coal.

Upon gasification of the coal in fluidized bed or fly-dust reactors, the dense plug initially formed in the screw extruder or at the discharge opening thereof must be crushed again upon entrance into the reactor chamber in order for the coal to be gasified in the desired finely divided state. West German Unexamined Application 22 56 409 discloses a screw extruder which is suitable for this purpose in which a mechanical crushing device is provided for the plug of material. It has also been proposed to pulverize the mass directly upon its entrance into the reactor chamber by the action of gas under pressure on the mass.

The above-mentioned screw extruders are capable of fulfilling their purpose in the normal operation of a pressure gasifier but they cannot be directly used, in their known construction under special operating conditions. This is true, in particular, for starting up against gas pressure, which is not possible with the known embodiments, so that in case of a disturbance, the pressure must be first reduced in the reactor before subsequent start-up. Furthermore, the mechanical devices customarily used for the crushing of the plug of material are very complicated and subject to breakdown.

SUMMARY OF THE INVENTION

An object of the present invention is to provide an apparatus of the aforementioned type such that it is possible to be started up against gas pressure without impairing the fine state of distribution of the fuel required in fly-dust gasifiers.

This object is achieved, in accordance with the invention, in that the discharge opening is provided with a closure member and leads to the ambient environment is provided in the housing near the discharge opening, the closure member of the discharge opening and that of the outlet opening being actuatable alternately. With this arrangement, starting up against gas pressure can be carried out in simple manner by causing the discharge opening to remain closed by the closure member associated with it until a sufficiently gas-tight plug of material has been formed in the apparatus. The material which is conveyed during this time passes into the ambient environment through the outlet opening, whose closure member is opened.

This construction serves as an effective safety measure since, in case of any disturbance, the discharge opening of the worm housing can be immediately closed. At the same time, blockage of the conveyor worm is prevented since the material can escape through the outlet opening.

According to a further feature of the invention, the closure member of the discharge opening is movable coaxially with respect to said opening. In this way an annular slot can be formed from which the material emerges in the form of clods. For moving the closure member of the discharge opening there is provided an adjustable pressure device preferably hydraulic, by means of which the size of the outlet slot can be regulated in accordance with the consistency of material and the pressure in the reactor.

Depending on the size and shape of the discharge opening, the closure member may be (a) a plate which can be brought to the edge of the discharge opening or (b) a plunger which extends into the discharge opening in the form of a nozzle, the discharge of the material taking place in the latter construction in the form of very small clods, the size of which in turn influences the dimensions of the conduits leading to the reactor.

As a further means for the crushing of the compacted mass and for assisting in its transport into the reactor there is further provided, in accordance with the invention, one or more pressure gas feeds which are directed towards the discharge opening. It is particularly advantageous in this connection to provide a pressure gas feed coaxially in the closure member of the discharge opening since in this way a division of the emerging strand of material is effected.

BRIEF DESCRIPTION OF THE DRAWING

FIG. 1 is a longitudinal sectional view of an apparatus for introducing solid fuels ito a pressure gasification reactor during starting.

FIG. 2 shows a discharge portion of the apparatus in FIG. 1 in operating position.

FIG. 3 shows a modified embodiment of the discharge portion also in operating position.

DETAILED DESCRIPTION

The apparatus in FIGS. 1 and 2 comprises a cylindrical housing 1 having a rotatable conveyor worm 2 tightly fitted therein. Solid fuel which is to be gasified, for instance coal, is fed in finely divided form, into housing 1 via a feed hopper 3 and is compacted, optionally after mixture with a binder such as, for instance, water or hydrocarbons, within the housing 1 or in the threads of the conveyor worm 2 so as to form a gas-tight plug of material. An axial discharge opening 4 is provided in the end wall of the housing 1 through which the mass is discharged from the housing 1 and fed via a conduit 5 into a pressure gasification reactor 6 disposed below the apparatus.

Within the space enclosed by the conduit 5 and opposite the discharge opening 4 there is a closure member movable coaxially with respect to said opening, said closure member comprising a plate 7 which can be brought against the edge of the discharge opening 4. The plate 7 is moved by a hydraulic piston-cylinder unit 8 which holds the plate 7 against the discharge opening 4 with adjustable pressure.

In proximity to the discharge opening 4 there is provided in the longitudinal wall of the housing 1 a radial outlet opening 9 which leads to the ambient atmosphere. The opening 9 is provided with a closure member 10 which can be introduced, in sealing manner, into the opening 9 and which is also moved by a hydraulic piston-cylinder unit 11. The piston-cylinder units 8 and 11 are connected to one another by suitable control and regulating means such that the associated closure members are actuated alternately, namely, when one is open the other is closed. The control and regulating means is diagrammatically illustrated in the drawing and requires no description of the details thereof as its construction will be obvious to those skilled in the art and merely requires the judicious selection of suitable multiple path valves so that alternate on-off operations of the hydraulic units are effected.

In the starting position shown in FIG. 1, the discharge opening 4 is tightly closed by the plate 7 which is seated on the edge of the opening 4. Through the outlet opening 9 which is open during this time, the mass of material transported by the conveyor worm 1 passes into the ambient atmosphere as indicated by the arrow, until there is established a consistency of the material suitable for building up the required sealing pressure, whereupon, as shown in FIG. 2, the outlet opening 9 is closed and at the same time the discharge opening 4 is opened. The degree of opening of opening 4 is effected by suitable adjustment of the pressure exerted by the hydraulic piston-cylinder unit 8 to such an extent that a gap is formed between the discharge opening 4 and the plate 7, through which gap the mass emerges in the form of clods 12. These clods break down to form dust, which passes at the end of the conduit 5 into the pressure gasification reactor 6.

In order to assist in the breaking down of the clods, one or more pressure gas feeds 13 are directed against the mass emerging from the slot as indicated in FIG. 2. The jet of gas emerging from each of the pressure gas feeds 13 can by itself effect the comminuting of the emerging plug of material, as is, for example, the case when the plate 7 is at its extreme right-end position. The pressure gas can be an inert gas, synthesis gas or a gasification agent, for instance a steam-oxygen mixture.

In the embodiment of FIG. 3, the end of the housing 1 is closed by an end wall 14. In this end wall there is provided a discharge opening in the form of a nozzle 15, into which a plunger 16 sealingly extends as a closure member. The closing position of the plunger 16 is shown in dotted lines. The manner of operation is the same as in the case of the embodiment of FIG. 2, except that in this case smaller clods 12' are produced, so that smaller dimensions can be provided for the conduit 5 as compared to the embodiment in FIGS. 1 and 2.

A pressure gas feed 17 as an additional or the sole means for the break-up of the plug of material is arranged coaxially within the plunger 16 in the embodiment shown in FIG. 3. In addition, further radial pressure-gas feeds can also be provided, in a manner similar to that shown in FIG. 2.

The closure member in the form of the plate 7 or the plunger 16 serves as a safety device in the event of a disturbance in operation. By rapid actuation of the piston-cylinder unit 8 it becomes possible to immediately shut the apparatus down without impairing the action of the conveyor worm 2, since the latter can then freely convey the material, in the same manner as during starting, into the ambient atmosphere through the outlet opening 9.

What is claimed is:

1. Apparatus for the gasification of solid fuel comprising a gasification reactor, a housing, means for supplying finely divided fuel into said housing, a conveyor worm rotatably mounted in said housing in tight-fitting relation therein to advance the fuel through the housing while compacting the same to form a gas-tight plug, said housing having a discharge opening in communication with the reactor and through which the plug is fed for supply to the reactor, closure means for selectively opening and closing said discharge opening, said housing being provided with an outlet opening in proximity to said discharge opening, said outlet opening being open to the ambient atmosphere, and further closure means for selectively opening and closing said outlet opening, said closure means and said further closure means being operatively coupled so that when one is operated to close the associated opening the other is operated to open the associated opening.

2. Apparatus as claimed in claim 1 wherein said closure means comprises a closure member which is movable coaxially with respect to said discharge member.

3. Apparatus as claimed in claim 2 wherein said closure means includes an adjustable pressure device operatively coupled to said closure member.

4. Apparatus as claimed in claim 3 wherein said adjustable pressure device comprises a hydraulic cylinder unit.

5. Apparatus as claimed in claim 3 wherein said closure member comprises a plate facing said discharge opening for being pressed against the housing to close said discharge opening.

6. Apparatus as claimed in claim 3 wherein said closure member comprises a plunger for penetrating into said discharge opening to close the same.

7. Apparatus as claimed in claim 6 wherein said discharge opening constitutes a nozzle.

8. Apparatus as claimed in claim 1 comprising means for directing fluid under pressure towards said discharge opening to break-up the compacted plug discharged therefrom by the worm.

9. Apparatus as claimed in claim 8 comprising pressure-fluid supply means arranged coaxially in said closure means for the discharge opening.

10. Apparatus as claimed in claim 1 wherein said further closure means comprises a plunger for penetrating into said outlet opening to close the same.

11. Apparatus as claimed in claim 1 wherein said housing has a longitudinal wall and an end wall, said discharge opening being located in said end wall, said outlet opening being provided in said longitudinal wall and extending radially.

* * * * *